Jan. 13, 1925.

P. L. FANNEN

1,522,505

VARIABLE SPEED TRANSMISSION MECHANISM

Filed Jan. 21, 1924     5 Sheets-Sheet 1

Patented Jan. 13, 1925.

1,522,505

UNITED STATES PATENT OFFICE.

PATRICK L. FANNEN, OF NEW YORK, N. Y., ASSIGNOR TO JOHN W. PRENTISS, OF NEW YORK, N. Y.

VARIABLE-SPEED-TRANSMISSION MECHANISM.

Application filed January 21, 1924. Serial No. 687,407.

*To all whom it may concern:*

Be it known that I, PATRICK L. FANNEN, a citizen of the United States, residing at 18 E. 70th Street, New York city, in the county of New York, State of New York, have invented certain new and useful Improvements in Variable-Speed-Transmission Mechanism; and I do hereby declare the following to be a full, clear, and exact description of the invention, such as will enable others skilled in the art to which it appertains to make and use the same.

This invention relates to variable speed transmission mechanism, and particularly to that type which is intended for use on motor driven vehicles such as automobiles.

The most common types of variable speed transmission mechanism used on automobiles are known as the sliding gear type and the planetary type. Each of these types is open to many objections well known to persons familiar with the art. For instance, among other disadvantages, both of these types are variable only in definite predetermined steps, the sliding gear type usually having three speeds forward and one reverse, while the planetary type usually has only two speeds forward and one reverse. In either type a definite speed must be selected by the operator and the selection is necessarily limited.

One object of the invention is to provide a practical form of variable speed transmission mechanism, which is continuously variable as distinguished from the above mentioned types, so that practically any speed may be obtained from zero to a predetermined maximum.

Another object of the invention is to provide improved variable speed transmission mechanism which will be free of the objections to the former types and which will combine the advantages thereof.

Another object is to provide variable speed transmission mechanism particularly adapted for use on automobiles, and in which the speed may be gradually varied without the use of sliding gears.

It is a further object of the invention to provide variable speed transmission mechanism for automobiles by means of which the speed of the automobile may be gradually varied by a simple movement of a foot pedal or other controlling device.

Other objects will appear from the following description.

The invention is illustrated in the accompanying drawings, in which—

The present mechanism may be used for transmitting power from any driving member to a driven member where it is desired to drive the driven member at any one of a large number of speeds, but the mechanism has been especially designed for use on automobiles, in which relation it will be found to have numerous advantages over the former types of transmission mechanism, and, therefore, the invention will be hereinafter described as applied to an automobile.

In order that the following detail description will be clear as it progresses, and in order that the function of each part will be manifest as it is described, a brief description of the general operation of the mechanism will first be given.

In one embodiment of the invention the mechanism is interposed between the flywheel of the automobile engine and the propeller shaft of the automobile. It is capable of entirely disconnecting the propeller shaft of the automobile from the engine to establish what is generally known as a "Neutral" condition, or it may directly connect the propeller shaft to the engine to establish a direct drive known as "High" speed. The mechanism is further operable to drive the propeller shaft from the engine at any speed from zero to the maximum or high speed. In other words, the speed of the propeller shaft is continuously variable from zero to the maximum. The mechanism includes a reversing gear by means of which the propeller shaft may be driven from the engine in a direction which is opposite to its normal direction of rotation to propel the automobile backwards.

The mechanism is controlled by means of a foot pedal which is normally biased toward the driver by means of a spring. The extreme position of the pedal toward the driver corresponding with "High" speed. If the pedal be moved to its other extreme position, the mechanism is in the "Reverse" position. Intermediate these two positions is a position which, when occupied by the foot pedal, will set the mechanism in "Neutral" position. Means are provided for holding the pedal in the neutral position until it is released by the driver. When the pedal is so released from the neutral position and allowed to move toward the driver, the mechanism is gradually adjusted to increase the speed of the automobile smoothly and evenly from a minimum to the maximum.

The mechanism itself comprises a rotatable drum encircled by a brake band or strap which is controlled by an auxiliary lever on the foot pedal. By this arrangement the drum may be held stationary or allowed to rotate at will. The drum carries a pair of sprockets or pulleys whose effective diameter may be gradually varied in such a way that as the diameter of one increases the diameter of the other decreases, and vice versa. In other words, the sprockets are expansible and contractible. A silent chain or other power transmitting element, passing over the sprockets, causes the driving sprocket to drive the driven sprocket at various speeds depending upon the relative sizes or diameters of the two sprockets. The manner in which the driving sprocket is driven from the engine and the purpose of the rotatable drum, etc., will appear from the following detail description.

Figure 1:
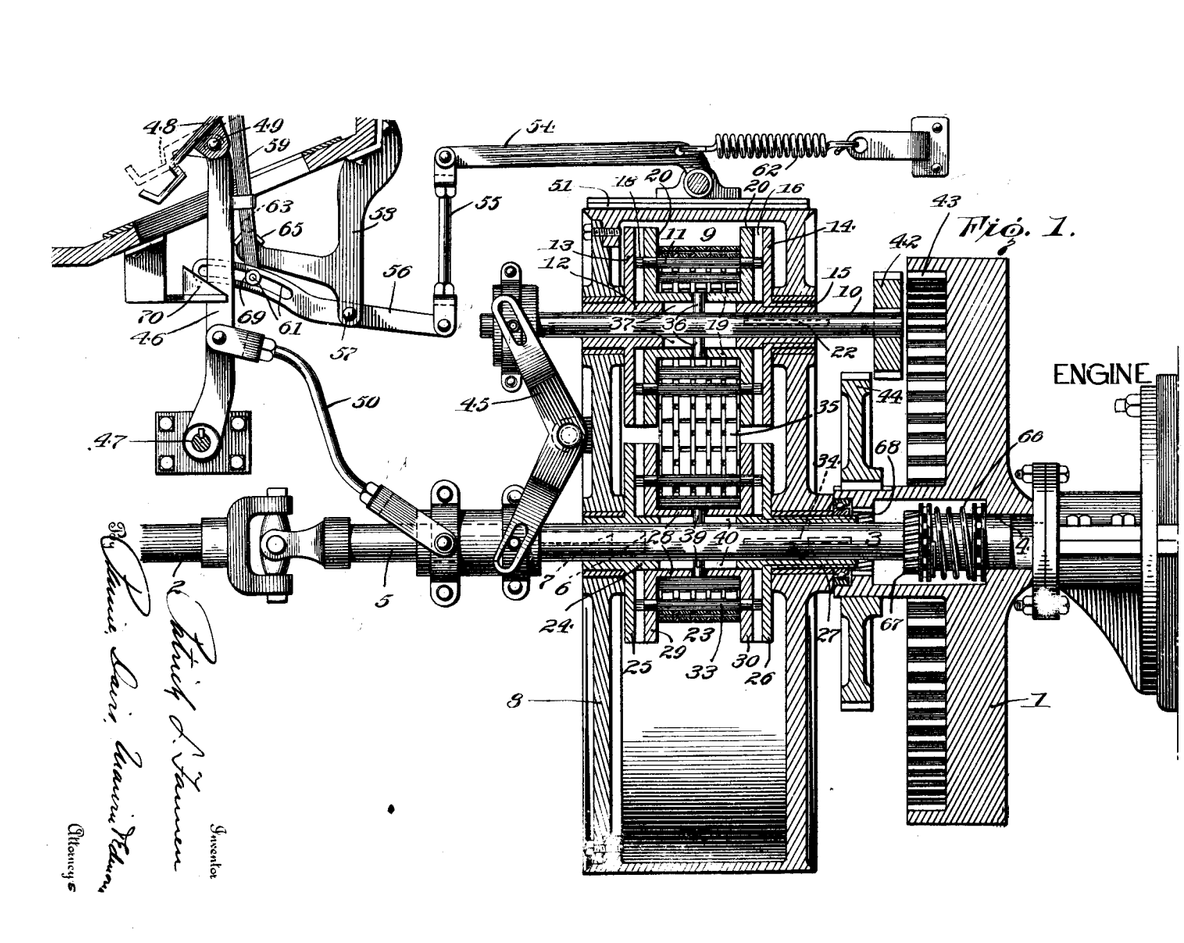
Figure 1 is a vertical section of the improved transmission mechanism, showing the same associated with the flywheel of an engine.
Figure 2:
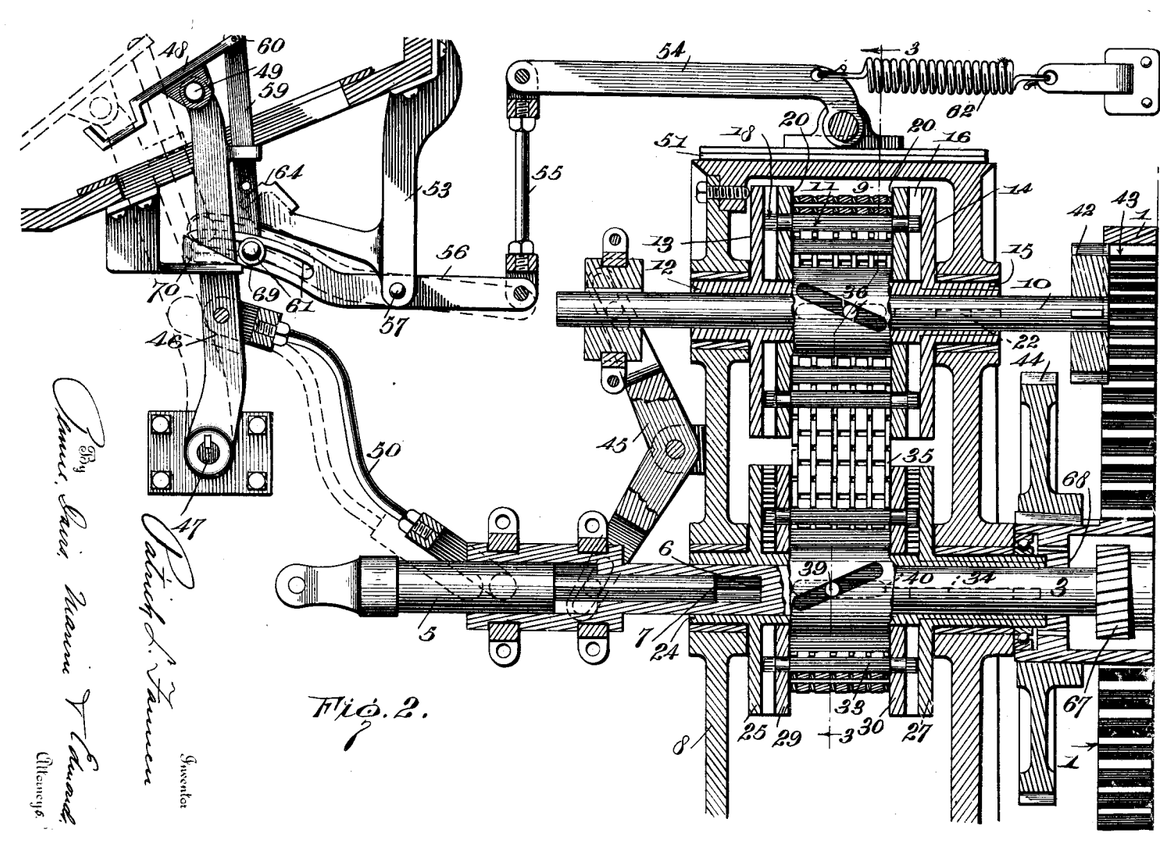
Figure 2 is a corresponding view somewhat enlarged to more clearly show the details of construction.
Figures 3, 4:
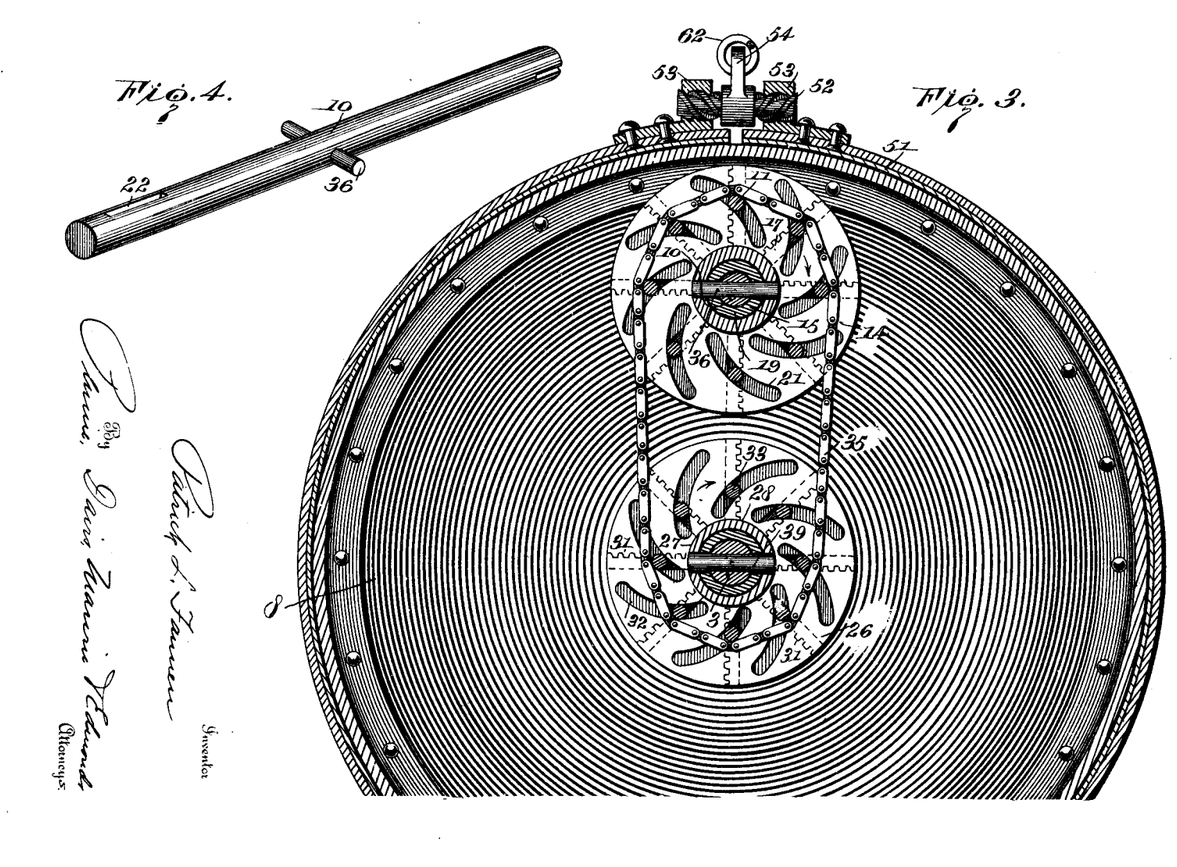
Figure 3 is a vertical section taken on the line 3—3 of Figure 2.
Figure 4 is a detail view of one of the spool shafts.
Figures 5, 6, 7, 8, 9:
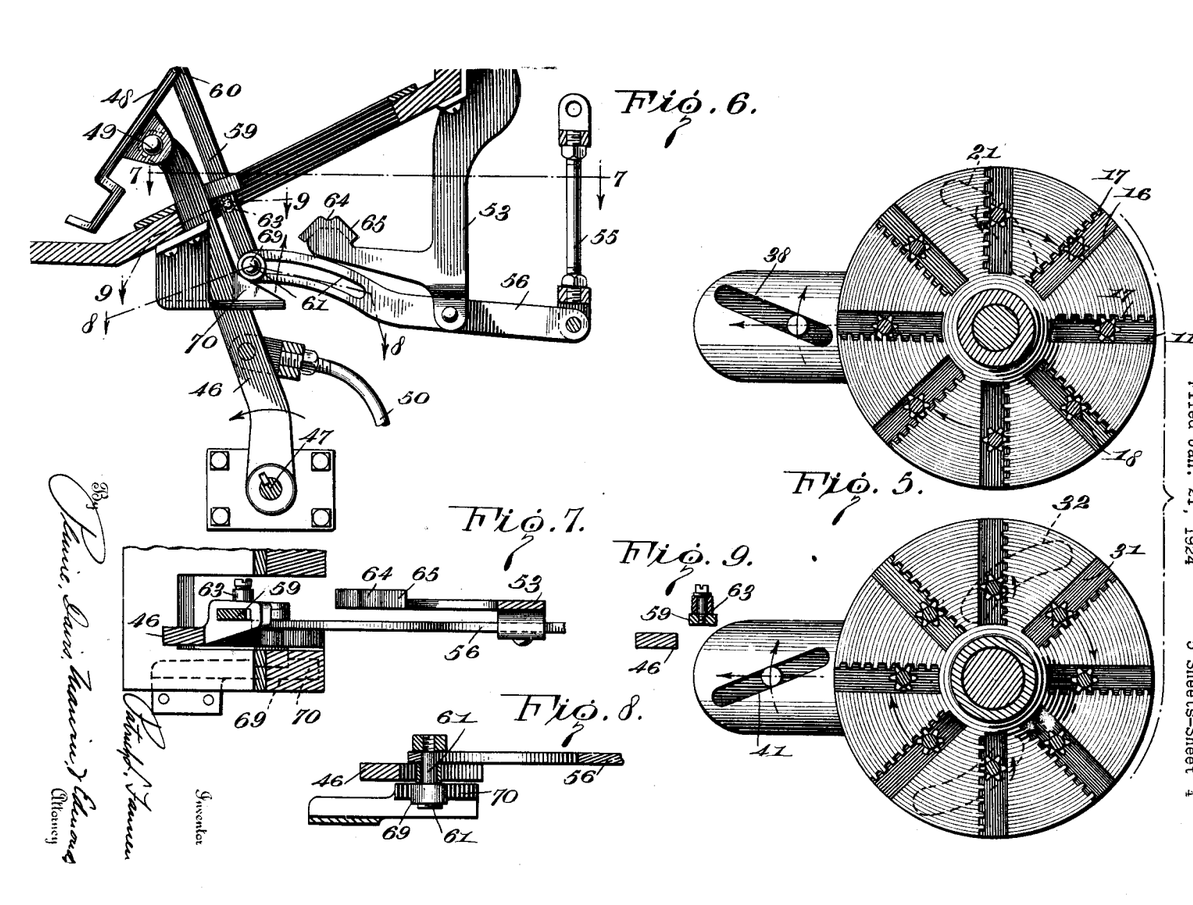
Figure 5 is a diagrammatic view illustrating the action of the spindles.
Figure 6 is a side elevation of the parts associated with the foot pedal.
Figure 7 is a horizontal section taken on the line 7—7 of Figure 6.
Figure 8 is a horizontal section taken on the line 8—8 of Figure 6.
Figure 9 is a horizontal section taken on the line 9—9 of Figure 6.

Referring particularly to Figures 1 and 2, the flywheel of the engine is represented at 1. The propeller shaft of the automobile is shown at 2. The apparatus to be hereinafter described constitutes the variable speed transmission mechanism interposed between the flywheel 1 and the propeller shaft 2. In other words, it constitutes the instrumentalities which cause the propeller shaft 2 to be driven from the flywheel 1, at the desired speed. A shaft 3 has a bearing at one end in the flywheel 1 as shown at 4. This bearing is such that the flywheel is free to rotate relative to the shaft 3, and the shaft 3 is free to slide longitudinally relative to the flywheel 1. The other end of the shaft 3 has a sliding connection with a stub shaft 5. This sliding connection may be established by providing a square recess 6 in the shaft 3, and providing a square projection 7 on the shaft 5 which is received by the recess 6. By reason of this connection, the shaft 3 may be moved longitudinally relative to the stub shaft 5, but when the shaft 3 rotates the rotation will be imparted to the stub shaft 5. A drum or casing 8 is mounted to rotate freely about the axis of the shaft 3. Located within the drum are the two sprockets or pulleys hereinbefore referred to. The driving sprocket, denoted generally by the reference character 9, is keyed to a shaft 10 which is free to slide longitudinally through the drum 8. The sprocket 9 comprises a number of toothed spindles 11, the extremities of which are guided in the flanges of a spool-like member which will hereinafter be termed the guide spool. For convenience in assembling, this guide spool may be made in two parts, one part comprising the hub 12 and one flange 13 and the other part comprising a second flange 14 with a sleeve 15 that slips over the extremity of the hub 12. When the flange 14 is assembled on the hub 12 as just described, a spool-like member is formed. The inner surface of each flange 13 and 14 is provided with radial slots or guideways 16 as shown in Figure 5. Rack teeth 17 are provided along one side of each of these slots, which teeth are engaged by corresponding teeth 18 formed on the extremities of the spindles 11. A second spool, which will hereinafter be referred to as the cam spool, comprises a hub portion 19 and flanges 20. The hub of the cam spool is telescoped over the hub 12 of the guide spool, so that the cam spool lies within the guide spool and so that each flange of the cam spool lies adjacent to the corresponding flange on the guide spool. The cam spool may be positioned on the hub of the guide spool before the flange 14 of the guide spool is assembled on the hub 12 of the guide spool. The flanges 20 of the cam spool are provided with arc-shaped cam slots 21, through each of which one of the spindles 11 passes. In each flange the number of cam slots corresponds with the number of spindles. It will be obvious from the construction so far described that if the cam spool be rotated with respect to the guide spool, the cam slots 21 will cause the spindles 11 simultaneously to move toward or away from the axis of the shaft 10. The spindles will be guided in their movement by the guideways 16, and as the spindles move in these guideways they roll along one side of them due to the provision of the rack teeth 17 and the teeth 18 on the extremities of the spindles. The hub 12 of the guide spool is keyed to the shaft 10 as shown at 22, so that when the shaft 10 is rotated the entire structure, comprising the guide spool, the cam spool and the spindles, will be rotated as a unit with the shaft. However, the shaft 10 is free to slide longitudinally through the hub 12 for the purpose to be hereinafter described.

The driven sprocket, denoted generally by the reference character 23, is constructed in a manner similar to the driving sprocket 9. The guide spool comprises a hub portion 24 having flanges 25 and 26, the flange 26 having a sleeve 27 which slips over one extremity of the hub 24 as in the case of the driving sprocket. The cam spool comprises a hub portion 28 provided with the flanges 29 and 30. The cam spool may be telescoped over the hub 24 of the guide spool, and then the flange 26 of the guide spool may be assembled on the hub 24 as in the case of the driving sprocket. The flanges 25 and 26 of the guide spool of the driven sprocket are provided with radial guideways 31 similar to the guideways in the flanges of the guide spool of the driving sprocket, and the flanges 29 and 30 of the cam spool of the driven sprocket are provided with cam slots 32 similar to the cam slots in the flanges of the cam spool of the driving sprocket. The driven sprocket has a number of toothed spindles 33 which are mounted in and actuated by the guideways and cam slots in the flanges of the spools as in the case of the driving sprocket. The hub 24 of the driven sprocket is keyed to the shaft 3 as shown at 34, in such a manner that the shaft 3 is free to slide longitudinally through the hub 24, but when the driven sprocket is rotated it will impart rotation to the shaft 3.

If the cam spool of the driven sprocket be rotated relative to the guide spool of the sprocket, it is obvious that the spindles 33 will be adjusted simultaneously toward or away from the axis of the shaft 3. That is, the cam slots in the flanges of the cam spool will cause the spindles 33 to move radially in the guideways, when the cam spool is rotated relative to the guide spool, in the same manner as described above in connection with the spindles 11 of the driving sprocket. A silent chain or other driving element 35 passes over the spindles of the two sprockets, so that when the driving sprocket is rotated it will drive the driven sprocket through the chain.

In order to effect rotation of the cam spool of the driving sprocket relative to the guide spool to adjust the spindles, pins 36 are provided on the shaft 10 which pass through slots 37 in the hub of the guide spool and project into inclined slots 38 in the hub of the cam spool (Figure 5). It is obvious that by this arrangement longitudinal movement of the shaft 10 will cause the cam spool to rotate relative to the guide spool, and this effects simultaneous adjustment of the spindles 11 either toward or away from the axis of the shaft 10, depending upon the direction of movement of the shaft 10. Likewise, pins 39, carried by the shaft 3, pass through slots 40 in the hub of the guide spool of the driven sprocket and project into inclined slots 41 (Figure 5) in the hub of the cam spool of this sprocket. When the shaft 3 is moved longitudinally in one direction or the other, the pins 39 will cause the cam spool of the driven sprocket to rotate relative to the guide spool, thus effecting simultaneous adjustment of the spindles 33 either toward or away from the axis of the shaft 3, depending upon the direction of movement of the shaft.

One end of the shaft 10 carries a pinion 42 capable of meshing with internal gear teeth 43 formed in the flywheel. In the extreme left hand position of the shaft 10 the pinion 42 is brought into mesh with the teeth of a reversing gear 44, keyed to the flywheel so as to rotate therewith.

The two shafts 10 and 3 are interconnected by means of a bell crank lever 45, so that if one shaft be moved in one direction, the other shaft will be moved simultaneously in the opposite direction.

It will now be seen that the apparatus so far described may be controlled by a longitudinal movement of either the shaft 10 or the shaft 3. In the present instance, suitable connections are made between the shaft 3 and a foot pedal whereby the shaft may be moved longitudinally. It may comprise a lever 46 pivoted at its lower end to a stationary support as shown at 47. The upper end of the lever 46 has pivoted thereto a foot rest 48, which is capable of being tilted or rocked about the axis of its pivotal connection 49. When the lever 46 is caused to swing about its pivot 47, the shaft 3 is moved longitudinally through the instrumentality of a link 50. The link 50 may have a suitable yoke connection with the shaft 3 as shown in Figure 2.

The drum 8 is encircled by a brake band or strap 51 which, when tightened or contracted about the drum, holds it stationary and prevents it from rotating. The brake band may be made to grip the drum 8 or release it by means of a rotatable screw shaft having its extremities threaded in opposite directions. The ends of the screw shaft 52 have threaded engagement with the extremities 53 of the brake band, and it will therefore be obvious that when the screw shaft 52 is rotated it will either cause the extremities of the brake band to approach each other or to move apart, thus either contracting the brake band about the drum 8, or expanding it to release the drum. The screw shaft 52 may be rotated by means of a lever 54 rigidly connected to it. The lever 54 may be actuated through the intermediary of a link 55 from a pivoted lever 56 (Figures 1 and 2), pivoted at 57 to a stationary bracket 58. The lever 56 is controlled by the foot rest 48. For this purpose a link 59 is pivotally connected at its upper end to the foot rest as shown at 60, and has a pin and slot connection with the lever 56 as shown at 61. The pin and slot connection 61 is made necessary by reason of the fact that the link 59 moves bodily with the foot lever 46, while the lever 56 remains stationary, and therefore the slot of the pin and slot connection 61 is made arcuate to allow for this movement. However, it will be obvious that in any position of the foot lever 46, the lever 56 may be actuated by tilting the foot rest 48. Such a tilting movement of the foot rest 48 will shift the lever 56 by reason of the link 59, and this movement of the lever 56 will be transmitted to the lever 54 through the link 55, thus effecting the desired operation of the brake band. The lever 54 is held in its retracted position by means of a spring 62. The spring 62 tends to hold the lever 54 and the various parts associated with it in such a position that the foot rest 48 is normally held in the position shown in Figure 2. In this position of the foot rest the brake band 51 will be contracted about the drum 8 to hold it stationary. If at any time the foot rest 48 be tilted about its pivotal connection 49 in such a manner that the slotted end of the lever 56 will be lifted, the brake band is expanded and the drum 8 will then be free to rotate.

The normal position of the pedal mechanism is shown in Figure 1. In this position a pin or roller 63 is supported in the notch or recess 64 (Figure 2) of a cam 65, which may be conveniently supported by an extension on the bracket 58. In this position of the pedal mechanism, the link 59 is held in its lifted position, or, otherwise stated, the foot rest 48 is held in its depressed position and this serves to maintain the brake band in its expanded condition in which the drum 8 is free to rotate. In this position of the pedal mechanism, the shaft 10 is in such a position that the pinion 42 will not mesh with either the teeth 43 in the flywheel, or the teeth on the reversing gear 44. In this position of the pedal mechanism, the parts are in neutral position for two reasons; first, because the brake band is loose about the drum 8 and, second, because the pinion 42 is not operative to transmit motion from the flywheel to the sprockets. It should be noted that the neutral condition which results from the position of the pinion 42, is only brought about when the foot lever 46 is in approximately the position shown in Figure 1, but the neutral condition brought about by loosening the brake band can be obtained at any time by merely depressing the foot rest 48. Whenever the foot lever 46 approaches the position shown in Figure 1, the roller 63 on the link 59 rides up one of the inclined surfaces on the cam 65 until it engages in the notch 64. In this way the pedal mechanism is normally held in a yielding manner in such a position that the transmission mechanism is in neutral condition. It is advantageous to have some such arrangement as this for holding the pedal mechanism in a predetermined position corresponding to neutral condition of the transmission mechanism, because when the automobile is not being used it is desirable to have the transmission mechanism in its neutral condition and to have the pedal mechanism in a position which will correspond to this neutral condition.

The shaft 3 is normally biased toward the left in Figures 1 and 2 by means of a coiled spring 66. The foot lever 46 therefore tends to move toward the driver.

If the foot lever 46 be allowed to move to its extreme position toward the driver, clutch teeth 67 preferably formed on the shaft 3 come into engagement with corresponding clutch 68 formed on the flywheel 1, and this establishes a direct connection between the flywheel and the shaft 3. This corresponds to "Direct drive" or "High" speed. It may be desirable to incline the teeth 67 and 68 slightly in order to prevent a too sudden connection between the flywheel and the shaft 3. When the foot lever 48 approaches its extreme position toward the driver, a roller 69 carried by the link 59 rides up the inclined surface of a cam 70, which has the same effect in lifting the link 59 that the cam 65 has. In other words, the cam 70 will tilt the foot rest 48 and thereby cause the brake band to be loosened to permit the drum 8 to rotate with the shaft 3. When the foot lever 46 is moved from the position shown in Figure 1 to its extreme position away from the driver, the pinion 42 comes into mesh with the teeth on the gear 44, and the shaft 10 will then be rotated in a direction which is opposite to its normal direction of rotation. This will cause the automobile to be propelled backwards.

The operation of the apparatus so far described is as follows. It will be assumed that the foot lever is in the position shown in Figure 1. In this position of the foot lever, the shafts 3 and 10 are in such a position that the pinion 42 will occupy a position which is intermediate the teeth on the flywheel 1 and the reversing gear 44. In this position of the parts there is no connection between the flywheel and the transmission mechanism, and, therefore, the automobile cannot be made to move. Furthermore, in this position of the parts the brake band is loose about the drum 8 and even if the pinion 42 is rotated by the flywheel 1, this would merely cause the drum 8 to rotate about the axis of shaft 3, and under these circumstances the sprocket 9 would be carried around bodily with the drum and would not be effective to drive the driven sprocket. Now if it be desired to start the automobile in motion after the engine has been started, the foot rest 48 is depressed enough to disengage the roller 63 from the notch 64. The foot rest 48 is then allowed to assume its normal position in which the brake band will become tightened about the drum. Thereafter, when the foot lever 46 is allowed to approach the driver, the shaft 3 will be gradually moved toward the left in the drawing, and this will move the shaft 10 toward the right in the drawing. About the same time that the brake band grips the drum 8, the pinion 42 comes into mesh with the teeth in the flywheel 1. If desired, the foot rest 48 may be held depressed while the foot lever 46 moves toward the driver a sufficient distance to cause the pinion 42 to become well engaged with the teeth in the flywheel 1, before the brake band is allowed to grip the drum. This will prevent sudden rotation of the shaft 10, because the first motion will be a rotation of the drum 8 about the axis of shaft 3. Then, as the foot rest 48 is gradually released, the drum 8 will be gradually gripped by the brake band, and as the rotation of the drum 8 is gradually arrested, the shaft 10 is gradually set in motion. Further movement of the foot lever 46 toward the driver will cause the shaft 10 to move further toward the right in Figures 1 and 2, while the shaft 3 will move further toward the left. This will cause the spools of the driving and driven sprockets to be so adjusted that the spindles of the driving sprocket will be simultaneously adjusted away from the axis of the shaft 10, and the spindles of the driven sprocket will be simultaneously adjusted toward the axis of the shaft 3. In other words, the effective diameter of the driving sprocket will become larger and the effective diameter of the driven sprocket will become smaller. This gradually increases the speed of the shaft 3, and likewise the speed of the propeller shaft 2. In this manner the speed of the automobile is gradually increased until the foot lever 46 reaches its extreme position toward the driver, in which the cam 70 causes the brake band to be released, and then the clutch 66—67 will establish a direct connection between the flywheel and the shaft 3. Movement of the foot lever 46 in the opposite direction will obviously cause a reverse operation of the parts, that is, as the foot lever 46 is moved away from the driver, the effective diameter of the driving sprocket is decreased while that of the driven sprocket is increased, and this serves to decrease the speed of the automobile. In order to cause the automobile to move backwards, the foot lever 46 is moved to its extreme position away from the driver, under which circumstances the pinion 42 will come into mesh with the reversing gear 44, and then by properly manipulating the foot rest 48 the brake band, if in its loose condition, may be made to grip the drum 8 gradually so as to slow up the speed of the drum, and thereby slowly start the shaft 10 rotating in a direction which is opposite to its normal direction of rotation. This will cause the driving sprocket to drive the driven sprocket in its opposite direction and thereby cause the automobile to be propelled backwards.

If during the operation of the mechanism the pinion 42 should not readily mesh with the teeth in the flywheel, or if it should not readily mesh with the teeth in the reversing gear 44, the brake band may be slightly released by manipulating the foot rest 48, and this will allow the drum 8 to rotate slightly until the gear teeth will mesh. Of course, if the brake band be already in its loose condition when the gears come into mesh, this operation may not be necessary. It will thus be seen that the brake band may be loosened at any time by manipulating the foot rest 48, and no matter in what position the foot lever 46 happens to be, the brake band may be loosened to permit the drum 8 to rotate, and this, in effect, establishes a neutral condition. The speed of the automobile may be varied at will by appropriate movement of the foot lever, as a movement of the foot lever in one direction will decrease the speed of the automobile, while a movement of the foot lever in the other direction will increase its speed.

Figures 10, 11, 12:
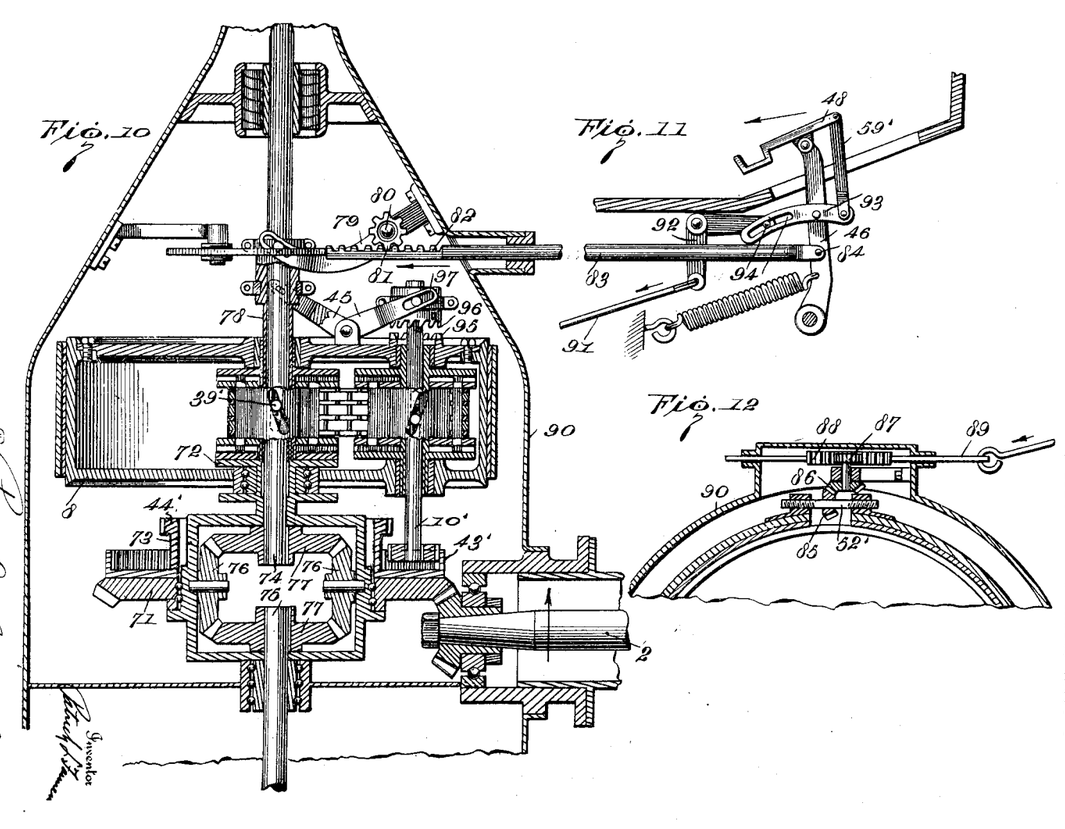
Figure 10 is a horizontal section showing the improved mechanism associated with the crown gear on the rear axle of an automobile.
Figure 11 is a side elevation of one type of pedal mechanism which may be employed for operating the transmission apparatus of Figure 10.
Figure 12 is a vertical transverse section showing the operating instrumentalities between the brake band of Figure 10 and the rod leading to the pedal mechanism.

Figure 10 shows the mechanism applied to the crown gear on the rear axle of an automobile. The operation is essentially the same except that the shaft 10′, which corresponds to the shaft 10 in the other form of the invention, is driven from internal gear teeth 43′ associated with the crown gear 71. The driving and driven sprockets are constructed in the same manner as in the other form of the invention, but instead of the driven sprocket being keyed directly to the shaft on which it is mounted, it is secured to a part 72 of the housing 73 that contains the differential gearing. In this manner the axle 74 of one rear wheel of the automobile and the shaft 75 of the other rear wheel may be driven at differential speeds, because the drive is from the sprocket 72 through the housing 73, satelite pinions 76, and then through the axles 74 and 75 through the gears 77 keyed thereto. Due to this arrangement slightly different means for adjusting the diameter of the driven sprocket is necessary. In order to effect this, a sleeve 78 surrounds the axle 74, and this sleeve carries pins 39' which adjust the cam spool in order to change the effective diameter of the sprocket. The sleeve 78 is free to slide longitudinally on the axle 74, and the sliding motion of the sleeve corresponds with the longitudinal motion of the shaft 3 in the other form of the invention and is for the same purpose. The sleeve 78 may be adjusted from the pedal mechanism in any suitable manner. For instance, a lever 79, pivotally supported at 80, may have a suitable yoke connection with the sleeve 78 in such a manner that when the lever 79 is shifted about the axis of its pivotal support 80, it will move the sleeve 78 longitudinally. The lever 79 may be shifted in this manner by a pinion 81 meshing with a rack 82 carried by a rod 83. The pinion 81, when rotated, transmits the movement directly to the lever 79 so that as the pinion 81 rotates, that end of the lever 79 which is connected to the sleeve 78 swings in the arc of a circle to effect longitudinal movement of the sleeve 78. The other end of the rod 83 is connected to the foot lever 46 as shown at 84. In this form of the invention the mechanism for expanding and contracting the brake band may comprise a screw shaft 52', which may be operated by the beveled pinions 85 and 86. The pinion 86 may be connected on the same shaft with a pinion 87, which is driven by means of a rack 88 carried by a rod 89 that slides longitudinally through the housing 90 that encloses the entire mechanism. The rod 89 may be connected by means of a link 91 with a bell crank lever 92 (Figure 11), which may be operated by the foot rest 48. The connections between the foot rest 48 and the bell crank lever 92 may consist of a link 59' and a lever 93 pivotally supported by the foot lever 46 and connected at one end to the link 59', and having a pin and slot connection 94 at its other end with the bell crank lever 92. It is obvious that by this arrangement a tilting action of the foot rest 48 will cause the brake band to be actuated, and this may be accomplished in any position of the foot lever 46.

In this form of the invention it may be more convenient to locate the high speed clutch in a different place. For instance, clutch teeth 95 may be provided on the drum 8 and corresponding teeth 96 may be provided on an enlargement 97 on the shaft 10'. In the extreme position of the foot lever 46 away from the driver, the teeth 96 will engage with teeth 95 and this will lock the shaft 10' to the housing, so that when the brake band is released all parts of the mechanism will rotate as a unit, and thereby establish in effect a direct drive from the propeller shaft 2 to the rear axles 74 and 75. The reversing gear 44' in this form of the invention may be formed on an extension on the gear 43' as shown in Fig. 10.

In all respects, except those noted above, the operation of the apparatus disclosed in Figures 10 to 12 inclusive is substantially the same as in the other form of the invention, the main difference being that the variable speed mechanism is driven from the crown gear of the differential mechanism instead of from the flywheel of the engine.

What I claim is:

1. Variable speed transmission mechanism comprising a rotatable drum, means for controlling the rotation thereof, a pair of expansible and contractible sprockets carried by said drum, means for simultaneously expanding one of said sprockets and contracting the other, a driving element passing over said sprockets, means whereby one of said sprockets may be driven from a driving element and means whereby the other sprocket may drive a driven element.

2. Variable speed transmission mechanism comprising a rotatable casing, means for controlling the rotation thereof, a rotatable driving member and a rotatable driven member mounted in said casing, each of said members being provided with a plurality of adjustable elements whereby the effective diameter of each member may be varied, means acting on said elements to adjust the same so that the effective diameter of one member is increased while the effective diameter of the other member is decreased and vice versa, means whereby said driving member may be driven from a driving element, and means whereby the driven member may drive a driven element.

3. Variable speed transmission mechanism comprising a rotatable drum, means for controlling the rotation thereof, an expansible and contractible driving sprocket rotatably mounted in said drum, an expansible and contractible driven sprocket rotatably mounted in coaxial relation with the drum, a driving element passing over said sprockets, means for simultaneously expanding one of said sprockets and contracting the other, means whereby the driving sprocket may be driven from a driving element, and means whereby the driven sprocket may drive a driven element.

4. Variable speed transmission mechanism comprising a driven shaft, a rotatable casing mounted to rotate about the axis of said shaft, means for controlling rotation of the casing, a driving shaft rotatably mounted in said casing, an expansible and contractible sprocket keyed to each of said shafts, a driving element passing over said sprockets, means for simultaneously expanding one of said sprockets and contracting the other, means whereby the driving shaft may be rotatably connected to or disconnected from a driving element, and means whereby the driven shaft may drive a driven element.

5. In a motor vehicle the combination with the engine of variable speed transmission mechanism for transmitting power from the engine to the vehicle, said mechanism comprising a rotatable casing, means for controlling rotation thereof, a pair of expansible and contractible sprockets carried by said casing, means for simultaneously expanding one of said sprockets and contracting the other, a driving element passing over said sprockets, means whereby one of said sprockets may be driven from the engine, and means whereby the other sprocket may transmit power to the vehicle.

6. In a motor vehicle the combination with the engine of variable speed transmission mechanism for transmitting power from the engine to the vehicle, said mechanism comprising a rotatable casing, means for controlling rotation thereof, an expansible and contractible driving member rotatably mounted in said casing, an expansible and contractible driven member rotatably mounted in said casing, means for simultaneously expanding one of said members and contracting the other, means whereby one of said members may be driven from the engine, and means whereby the other member may transmit power to the vehicle.

7. Variable speed transmission mechanism comprising a rotatable casing, means for controlling the rotation thereof, an expansible and contractible driving sprocket in said casing, a longitudinally slidable shaft on which the said driving sprocket is keyed, an expansible and contractible driven sprocket in said casing, a longitudinally slidable shaft on which said driven sprocket is keyed, means whereby longitudinal movement of each of said shafts will expand or contract the sprocket carried thereby, connections between said shafts whereby a longitudinal movement of one shaft in one direction will produce a longitudinal movement of the other shaft in the other direction, means whereby the driven sprocket may transmit power to a driven element, and means whereby a driving connection may be maintained between the shaft of the driving sprocket and a driving element throughout a predetermined movement of said shaft.

8. In a motor vehicle the combination with a rotary element driven by the engine, of variable speed transmission mechanism for transmitting power from said rotary element to the vehicle, said mechanism comprising a rotatable casing, means for controlling rotation thereof, an expansible and contractible driving sprocket in said casing, a longitudinally slidable shaft on which said sprocket is keyed, means for establishing a driving connection between said shaft and said rotary driving element and maintaining said connection throughout a predetermined movement of said shaft, said means being capable of disconnecting said shaft from the rotary driving element in certain positions of the shaft, an expansible and contractible driven sprocket in said casing, means for simultaneously expanding one of the sprockets and contracting the other, and means whereby the driven sprocket may transmit power to the vehicle.

9. In a motor vehicle the combination with a rotary element driven by the engine of variable speed transmission mechanism for transmitting power from said rotary element to the vehicle, said mechanism comprising a rotatable casing, means for controlling rotation thereof, an expansible and contractible driving sprocket in said casing, a longitudinally slidable shaft on which said sprocket is keyed, means for establishing a driving connection between said shaft and said rotary driving element and maintaining said connection throughout a predetermined movement of said shaft, a reversing gear adapted to be brought into operation in another position of said shaft, said means being capable of disconnecting said shaft from the rotary driving element in certain positions of the shaft, an expansible and contractible driven sprocket in said casing, means for simultaneously expanding one of the sprockets and contracting the other, and means whereby the driven sprocket may transmit power to the vehicle.

10. In a motor vehicle the combination with the engine of variable speed transmission mechanism for transmitting power from the engine to the vehicle, said mechanism comprising a rotatable casing, change speed gearing in said casing comprising expansible and contractible driving and driven members, means for simultaneously expanding one of said members and contracting the other, a gear in driving relation with one of said members, means for moving said gear into and out of operative relation with a part driven by said engine, a reversing gear in operative relation with which said first named gear may also be moved, a controlling lever and connections whereby movement of said lever expands and contracts said sprockets and moves said gear to its various positions, an auxiliary lever on said controlling lever, and means whereby rotation of said casing may be controlled by movement of said auxiliary lever.

In testimony whereof I affix my signature.

PATRICK L. FANNEN.